June 30, 1953

C. A. DAVIS 2,643,849

SCREW ACTUATED VALVE WITH AUXILIARY
THREADED STEM SUPPORT
Filed May 9, 1947

INVENTOR.
CHARLES A. DAVIS
BY
*Garwood*
        *Attorney.*

Patented June 30, 1953

2,643,849

UNITED STATES PATENT OFFICE 2,643,849

SCREW ACTUATED VALVE WITH AUXILIARY THREADED STEM SUPPORT

Charles A. Davis, Mansfield, Ohio, assignor to The Ohio Brass Company, Mansfield, Ohio, a corporation of New Jersey Application May 9, 1947, Serial No. 746,939

9 Claims. (Cl. 251—43)

1

My invention relates to valves and in particular to valves suitable for use in blowing off boilers.

One object of my invention is to provide a valve for the above purpose in which there is a straight and clear passage between the inlet and the outlet ports at least equal in diameter to the inside diameter of the connected pipe.

Another object is to provide a valve in which the valve seat is protected from direct action thereon of the discharge through the valve.

Another object is to reduce substantially the length of the threaded support of the stem represented by the bonnet threads and thus reduce substantially the length of the bonnet.

Other objects will be disclosed as the description of the construction and operation of the valve proceeds.

In the drawing accompanying the description:

In the preferred embodiment of my invention a metal body 1 is provided which may be of either ferrous or non-ferrous material.

The body has a threaded inlet 2 and a threaded outlet 3 with a common axis. These openings 2 and 3 while shown threaded may be of the well known flange type.

Figure 1:
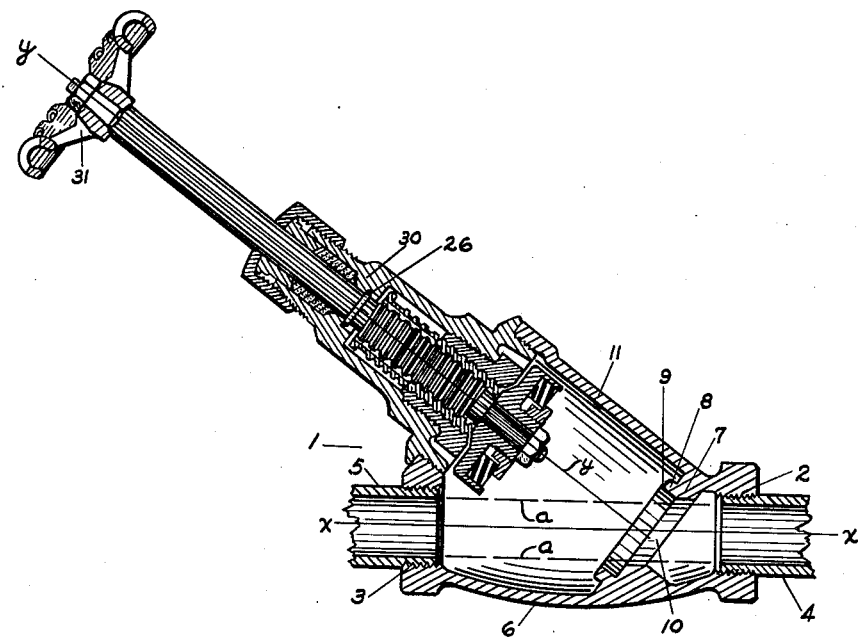
Fig. 1 is a view in substantially full section of my valve in a fully open condition.

To the inlet and outlet ends of Fig. 1 is shown attached a short section of pipes 4 and 5 defining an inlet port and an outlet port, respectively.

The main portion 6 of the body 1 is provided with a diaphragm 7 which is provided with a raised seat 8 having a contact seating surface 9.

The diaphragm 7 is also provided with an opening 10 the diameter of which is less than the inside diameter of the seat 8 and of the contact seating surface 9.

The diameter of the opening 10 is not less than the inside diameter of the pipe, i. e., the diameter of the inlet port and the outlet port, for which the valve body is designed.

The openings 2, 3 and 10 are in longitudinal alignment and have a common axis $x$—$x$ Fig. 1 and the relation of the inside diameter of the connected pipes (the inlet and the outlet ports) and of the opening 10 is shown by the dotted lines $a$ in Fig. 1.

It will be noted the diameter of the opening 10 is shown as greater than the inlet and outlet ports as shown by the lines $a$ and the contact seating surface 9 is outside the path of flow through the valve shown between lines $a$ which is free and unobstructed.

2

The discharge from the boiler is usually under high pressure and usually contaminated with sediment, sludge and other particles of a highly abrasive character and by constructing the diaphragm 7 and seat 8 as above described the contact seating surface 9 is protected from the cutting action of the flow through the valve.

The valve body 1 is provided with a branch or bonnet portion 11 having a longitudinal axis $y$—$y$ which angles at substantially 37 degrees from the axis $x$—$x$. The usual angle between the axes $x$—$x$ and $y$—$y$ of commercial valves is substantially 45 degrees. The effect of this angular change is later decribed.

I have departed from the usual manner of installing the operating mechanism for opening and closing the valve. The valve is provided with a disc holder 12 attached to the inner end of the stem 13 by the nut 14. A composition disc 15 is positioned in the disc holder 12 and secured by a flanged nut 16. Other forms of disc holders are common art and may be substituted for that shown.

A bonnet 17 is threaded to the branch portion 11 as is common practice and is provided with a packing cavity 18 through which the stem 13 passes. The cavity 18 is filled with packing 19 against which presses a gland 20. The end of the bonnet is threaded to receive the packing nut 21.

The bonnet is provided with a cavity 22 threaded at its lower end and a fixed bushing 23 is secured to said threaded portion. The opening 24 through the bushing is provided with a coarse thread such as is usually employed in connection with valve stems, as for instance of the Acme type.

Mounted in the threaded opening 24 of the bushing 23 is an elongated sleeve 25 threaded externally to cooperate with the bushing and threaded internally at one end for a portion of its length. The cooperating threads on the sleeve and stem are preferably the same as on the sleeve and bushing.

The stem is provided with a collar 26 which is arranged to engage a shoulder 27 within the sleeve, the collar being movable longitudinally within the opening 28 in the sleeve.

The sleeve has a flange 29 at its upper end which is arranged to engage the upper end of the bushing and limit the downward movement of the sleeve but not so as to prevent the seating of the disc 15 and seat 8 to close the valve.

Figure 2:
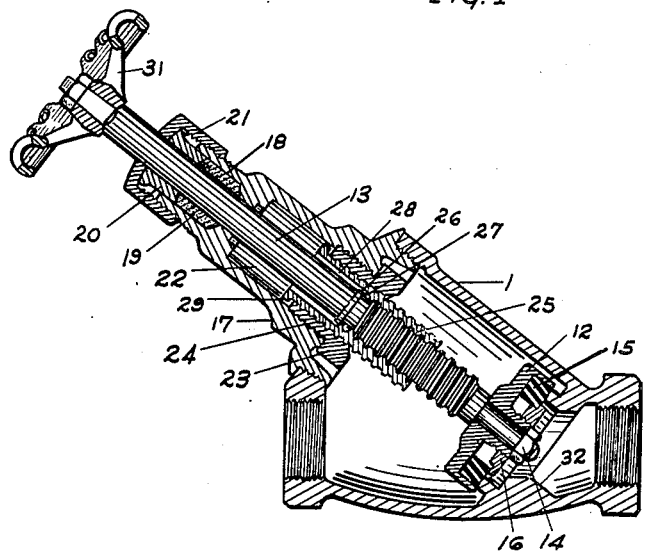
Fig. 2 is a view in substantially full section of my valve in a closed condition.

In Fig. 2 the valve is shown closed with the sleeve 25 shown in its lowest position with the collar 26 engaging the shoulder 27.

In Fig. 1 the valve is shown fully open with the lower end of the sleeve in engagement with the disc holder 12 and with the collar 26 engaging the shoulder 30 of the bonnet whereby the opening movement of the bushing 23 is checked. The disc holder is out of engagement with the bushing.

When the valve is operated to its open position from its closed position in Fig. 2, the hand wheel 31 is operated in an anti-clockwise direction. This operates the stem 13 which begins to open the valve due to the threaded engagement between parts 13 and 25. In this operation the sleeve 25 may remain non-rotatable until the holder 12 contacts same whereupon the sleeve 25 will rotate as a unit with the stem 13 but due to the threading between the parts 23 and 25 the sleeve will rise and with it the stem (both moving as a unit) until the collar 26 engages the shoulder 30.

If the friction between the stem and sleeve is greater than between the sleeve and bushing then the stem and bushing may rotated together from the start of opening the valve until rotation is stopped, as described in the preceding paragraph.

When the valve is operated from its fully open position of Fig. 1 to its closed position the hand wheel 31 is rotated clockwise and due to the threading between the stem 13 and sleeve 25 the stem will move toward its closing position relative to the sleeve 25 and continue to do so until the collar 26 engages the shoulder 27, then the sleeve and stem will rotate and move as a unit until the disc 15 engages the seat 8.

Here again friction may play its part in controlling the relative movement of the parts as stated before, but the result in the end will be the closing of the valve.

Due to the employment of the telescopically movable sleeve 25 coupled with the substantially increased threaded support of the stem in this construction, the length of the screw thread portion required on the stem in the closed position of the valve will be less than under ordinary constructions where the stem is threaded into a fixed part, as for instance if the threaded stem cooperated directly with the threads of the bushing 23.

This reduced stem thread length will permit substantially reducing the length of the bonnet or branch portion of the valve.

By making the angle of the axis y—y to the axis x—x less than the usual 45 degrees it is possible to get a clear, straight and unobstructed passage through the valve for the boiler discharge and to place the valve seat 8 and the contact surface 9 thereof away from direct cutting action thereon of the boiler discharge.

The abutment 32 will tend to direct any discharge striking the same into the main through passage and aid in protecting the seat 8.

The engagement of the collar 26 with the shoulder 30 will permit repacking the valve while blowing-off the boiler.

When the valve is fully open the disc 15 and disc holder 12 will be out of line with the through path of the boiler discharge.

With the axis y—y of the stem 13 and disc 15 at an angle of approximately 37 degrees to the axis x—x, the plane of the contact seating surface 9 will be normal to the axis y—y and at an angle of 53 degrees to the axis x—x which permits in the Y type of valve of placing the seat out of alignment with the boiler flow.

The majority of present-day blow-off valves have renewable seats as the seating surface is quite in the path of the boiler discharge. Applicant makes the seat 8 integral with the body.

What I claim as new is:

1. A valve comprising in combination a hollow body having an inlet port and an outlet port, a valve seat formed within the body, a projection on the body provided with a threaded bonnet, a threaded stem extending through the bonnet and projecting into the body and rotatable relative thereto and having a valve head to cooperate with the seat to close the valve, a sleeve surrounding the stem and having a threaded engagement with the threads on the stem and on the bonnet, means on the stem to engage means on the sleeve when the stem moves from an open position to a closed position, and means on the stem to engage means on the sleeve when the stem moves from a closed position to an open position whereby the stem and sleeve rotate in unison after said engagements.

2. A valve comprising in combination a hollow body having a main portion and a branch portion, the main portion having an inlet port and an outlet port in axial alignment, an obliquely disposed wall in said main portion intermediate the said ports, the wall provided with an opening in alignment with the ports, the diameter of the opening in the wall being at least as great as the inside diameter of the said ports, the wall provided on its side toward the outlet port with a raised seat surrounding the opening and having an inside diameter greater than the diameter of the opening in the wall, the seat provided with a seating surface out of the flow path formed by the said ports and opening, a bonnet closing the branch portion of the body, a screw-threaded stem extending through and projecting from the ends of the bonnet and rotatable relative thereto, a valve disc secured to the stem and engageable with the seating surface, an elongated sleeve interposed between the bonnet and the stem and having threaded connection with the bonnet and with the stem, means on the stem to engage means on the sleeve when the stem moves from a closed position to an open position, and means on the stem to engage means on the sleeve when the stem moves from an open position to a closed position whereby the stem and sleeve rotate in unison after said engagements.

3. A valve of the Y type comprising a recessed body having a main portion with an inlet port and an outlet port and a branched portion, the longitudinal axes of the main and branched portions forming an angle of substantially 37 degrees, the main portion having an inclined diaphragm disposed intermediate the said ports, the diaphragm having an opening aligned with the said ports and defining therewith a flow path, a seat surrounding the diaphragm opening and having a seating surface spaced radially outwardly from the diaphragm opening and out of said path, the plane of the seating surface being normal to the axis of the branched portion of the valve and forming an acute angle of substantially 53 degrees with the axis of the main portion of the body, a valve disc positioned in the branched portion of the body when the valve is fully open and engageable with the said seating surface, a bonnet closing the branched portion of the body and a threaded valve stem extending through the bonnet and projecting from the ends thereof, the valve disc secured to the inner end of the stem, a sleeve surrounding the stem and having threaded engagement with threads on the bonnet and on the stem, means on the stem to engage means on the sleeve when the stem moves from a closed to an open position and means on the stem to engage means on the sleeve when the stem moves from an open to a closed position whereby the stem and sleeve rotate in unison after said engagements.

4. A valve comprising a recessed body having a main portion and a branched portion, the main portion having an inlet port and an outlet port and an inclined diaphragm with an opening and a seating surface surrounding the opening, the ports and said opening being in alignment and defining a flow path and the seating surface being out of said path, the branched portion of the body closed by a bonnet, a threaded stem extending through the bonnet and rotatable relative thereto, a valve disc secured to the stem, means to rotate the stem secured thereto, an elongated sleeve interposed between the stem and the bonnet and having threaded connections with the stem and bonnet, means on the stem to engage means on the sleeve when the stem moves from a closed position to an open position and means on the stem to engage means on the sleeve when the stem moves from an open position to a closed position whereby the stem and sleeve rotate in unison after said engagements.

5. A valve according to claim 4 in which the threaded connection between the sleeve and bonnet is a bushing whereby the sleeve and stem are supported by the bonnet and the sleeve is movable longitudinally and rotationally relative to the bushing when the stem is rotated.

6. A valve according to claim 4 characterized by having the bonnet recessed and the threaded stem extending through the recess and projecting from each end of the bonnet, the threaded connection between the bonnet and the sleeve being a bushing located at the lower end of the recess, the sleeve interposed between the stem and bushing and having threaded connections with the stem and bushing whereby the sleeve is movable within the recess relative to the bushing and stem when the stem is rotated.

7. A valve comprising in combination a hollow body having a main portion and a branch portion, the main portion provided with an inlet port and an outlet port and an intermediate opening aligned therewith forming a straight unobstructed passage therethrough, the intermediate opening surrounded by a seat having a seating surface out of the path of fluid flow through said passage, the branch portion provided with a recessed bonnet and actuating means to open and close the valve, the said means comprising a stem extending through the bonnet and rotatable relative thereto and a valve disc and holder secured to one end of the stem within the valve body and arranged to engage the seat, the said bonnet provided with a thread and the said stem provided with a thread for a portion thereof, an elongated sleeve surrounding the stem and having threaded engagement with the threads on the stem and on the bonnet, the said sleeve engageable by means on the stem as the actuating means moves from a closed to an open position thereby effecting rotation of the sleeve until the valve is fully open, and means on the sleeve engageable by means on the stem as the actuating means moves from its open to its closed position thereby effecting rotation of the sleeve until the valve is fully closed.

8. A valve comprising a hollow body with an inlet port and an outlet port and a valve seat interposed between the said ports, said seat being protected from fluid flowing through the body, a valve disc arranged to engage the seat to close the valve, actuating means to move the disc to and away from the seat, the actuating means comprising a rotatable threaded stem with the valve disc secured to one end thereof, threaded means on the valve body to support the actuating means, an elongated sleeve interposed between the threaded portions of the stem and of the supporting means and cooperating with the threads thereof to effect movement of the valve stem and disc, means on the stem to engage means on the sleeve when the stem moves from an open position to a closed position and means on the stem to engage the sleeve when the stem moves from a closed position to an open position whereby the stem and sleeve rotate in unison after said engagements and means on the stem exterior of the valve body by which the actuating means may be operated.

9. A valve comprising a hollow body having an inlet port and an outlet port substantially in axial alignment, a seat in the body between said ports and provided with an annular seating surface, said seating surface being of greater minimum diameter than the diameter of said ports, an inclined projection on the body provided with a bonnet, a stem extending through the bonnet and projecting into the body and outside the bonnet and rotatable relative thereto, means on the outer end of the stem to rotate same, a valve disc carried by the stem for engagement with the annular seating surface to close the valve, a member threadably mounted in the bonnet to move longitudinally relative to said bonnet and surrounding the stem and threadably associated therewith, packing means surrounding the stem between the said member and the outer end of said stem and spaced from said member means on the stem to engage means on the sleeve when the stem moves from an open position to a closed position, and means on the stem to engage means on the sleeve when the stem moves from a closed position to an open position whereby the stem and sleeve rotate in unison after said engagements.

CHARLES A. DAVIS.

References Cited in the file of this patent

UNITED STATES PATENTS

| Number | Name | Date |
|---|---|---|
| 20,314 | Adams | May 25, 1858 |
| 262,829 | Prox | Aug. 15, 1882 |
| 333,941 | Frisbie | Jan. 5, 1886 |
| 688,012 | Berger | Dec. 3, 1901 |
| 1,203,371 | Lowe | Oct. 31, 1916 |
| 1,457,318 | Shevlin | June 5, 1923 |
| 1,529,583 | Ehrmann | Mar. 10, 1925 |
| 1,833,193 | Wray | Nov. 24, 1931 |

FOREIGN PATENTS

| Number | Country | Date |
|---|---|---|
| 566,342 | Germany | of 1932 |
| 580,427 | Germany | of 1933 |
| 613,022 | Germany | of 1935 |